United States Patent [19]

Jaklitsch et al.

[11] 4,159,478

[45] Jun. 26, 1979

[54] RADAR ECM SIMULATOR USING NO ELECTRICAL CONNECTION TO RADAR

[75] Inventors: Frederick J. Jaklitsch, Lutherville; Joseph R. Weger, Baltimore, both of Md.

[73] Assignee: The United States of America as represented by the Secretary of the Navy, Washington, D.C.

[21] Appl. No.: 839,799

[22] Filed: Jun. 30, 1969

[51] Int. Cl.² .............................................. G01S 7/38
[52] U.S. Cl. .................................... 343/18 E; 35/10.4
[58] Field of Search ...................................... 343/18 E

[56] References Cited

U.S. PATENT DOCUMENTS

3,019,433  1/1962  White ................................ 343/18 E

Primary Examiner—T. H. Tubbesing
Attorney, Agent, or Firm—Richard S. Sciascia; Robert W. Adams

[57] ABSTRACT

In a radar simulator, means are provided for creating a jamming signal to confuse and mislead a victim radar. The jamming signal may be made to appear to the victim radar to emanate from an aircraft which itself is a false target signal designed to mislead the victim radar. No electrical connections to the victim radar are required.

8 Claims, 11 Drawing Figures

RADAR ECM SIMULATOR USING NO ELECTRICAL CONNECTION TO RADAR

CROSS REFERENCE TO RELATED APPLICATIONS

This application discloses apparatus which may be used with the apparatus disclosed in copending application Ser. No. 753,221, filed August 16, 1968, now U.S. Pat. No. 3,898,662.

BACKGROUND OF THE INVENTION

The invention is in the field of radar simulating devices. In the prior art, radar simulators have been arranged to simulate the effects caused by ground reflections, targets, electronic countermeasures, etc., so that a trainee radar operator can observe the operating difficulties encountered by a radar operator in real life and thereby acquire experience. Heretofore, electrical connections between a radar and the simulator have been required in order for a simulator operator to be able to create the appearance of a target or of electronic countermeasures on the screen of a victim radar. This was inconvenient in a training situation and impossible when dealing with an unfriendly radar. This problem of the prior art has been overcome by the present invention which causes the effect of electronic countermeasures to appear on a victim radar scope, without requiring electrical connections between the victim radar and the invention.

SUMMARY OF THE INVENTION

Copending application Ser. No. 753,221 discloses a radar target simulator having no electrical connections to the victim radar. This simulator when located within range of a victim radar can transmit a ficticious target image which appears on the screen of the victim radar as a real target. In the present invention, an electronic countermeasures signal is modulated by taped information representing a victim radar's antenna reception pattern. The tape is synchronized with the speed of the victim radar's antenna and with the apparent location of a simulated target. The modulated signal is further modified in a pattern leveling circuit and transmitted to cause the ficticious target of copending application Ser. No. 753,221 to appear to be transmitting jamming signals.

DESCRIPTION OF THE PREFERRED EMBODIMENT

Figure 1:
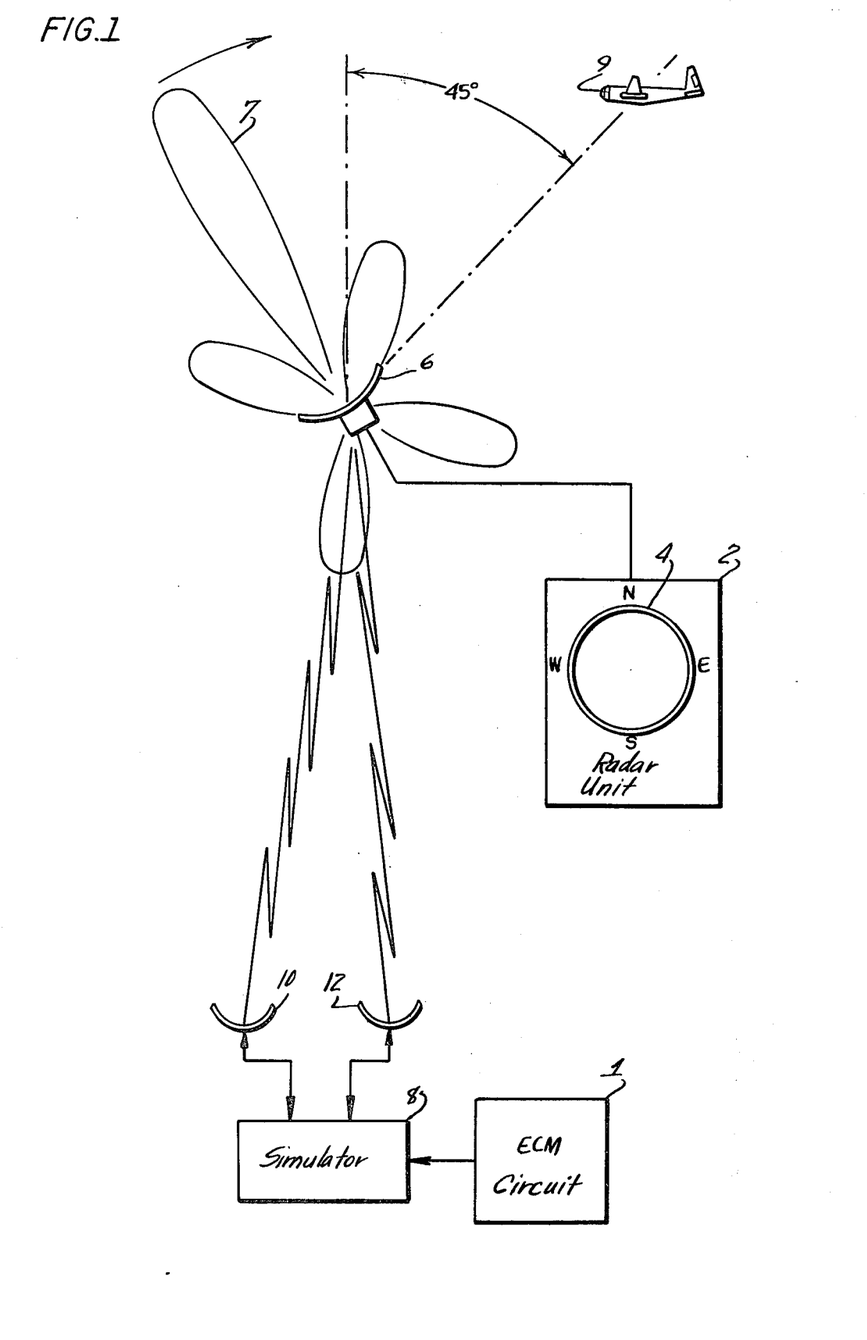
FIG. 1 shows the spatial relationships between an electronic countermeasures circuit, a victim radar, and a radar target simulator.

FIG. 1 shows the spatial relationship between a radar simulator 8 and a victim radar unit 2 and the electronic countermeasures circuit 1. Radar unit 2 has a display scope 4 on which is displayed a radar representation of the area swept by radar antenna 6. Antenna 6 has a pattern having a main lobe 7 which sweeps across spaced apart antennas 10 and 12 of simulator 8. As disclosed in copending application Ser. No. 753,221, simulator 8 using information derived from the sweeping of its antennas 10 and 12 by the antenna pattern, can generate and transmit a signal which will appear on scope 4 of radar unit 2 as a target 9, at any position chosen by the operator of simulator 8.

This invention adds an electronic countermeasures (ECM) circuit 1 to simulator 8 which can generate and transmit signals causing jamming signals to appear on scope 4 of radar 2. These jamming signals are such that they appear to the radar operator to originate from the same location as simulated target 9. This creates the appearance at radar scope 4 of a target 9 such as, for example, an enemy aircraft transmitting radar jamming signals. This greatly increases the realism of the simulation, and when employed in a trainer for training radar operators, greatly enhances the total training effect.

Figure 2:
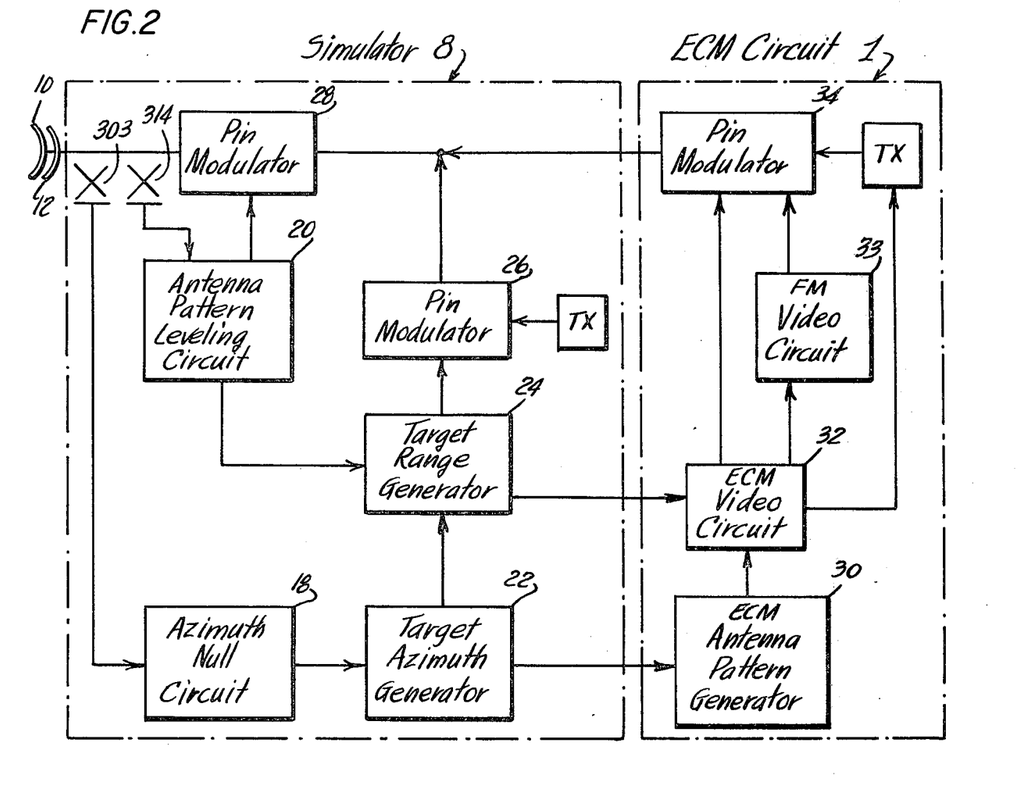
FIG. 2 is a block diagram showing the principal elements of the electronic countermeasures circuit of the invention, together with the principal elements of a radar target simulator.

FIG. 2 is a block diagram showing the principal elements of simulator 8 and electronic countermeasure (ECM) circuit 1 and their functional interrelationships.

In FIG. 2, simulator antennas 10 and 12 are coupled by couplers 303 and 314 to an azimuth null circuit 18 and an antenna pattern leveling circuit 20. The function of azimuth null circuit 18 is to generate a signal when the rotating main lobe 7 of the pattern of radar antenna 6 (FIG. 1) sweeps across antennas 10 and 12. This information is fed from azimuth null circuit 18 to a target azimuth generator 22 which determines a period within which simulator 8 can transmit a target signal to cause a simulated target to appear on radar scope 4 at a selected azimuth. Target azimuth generator 22 forwards this information to a target range generator 24 which divides the target azimuth period into smaller periods, one of which can be selected to cause the simulated target on radar display scope 4 to appear to be located at a particular range. A signal from target range generator 24 is forwarded to a pin modulator 26 and from 26 to a pin modulator 28 which furnishes the simulator ouput signal is antennas 10 and 12. The purpose of antenna pattern leveling circuit 20 is to "level" or regulate the amplitude of the simulator output signal so that the simulated target on radar scope 4 will have the correct intensity regardless of azimuth. Several detectors in leveling circuit 20 reduce the RF pulses received through antennas of radar antenna 6. This antenna pattern voltage is applied as an attenuating signal to pin modulator 28 which attenuates the output of simulator 8. Thus attenuation of the simulator target signals is greatest when the main lobe 7 of the radar antenna pattern sweeps across simulator antennas 10 and 12. Any signal applied to pin modulator 28 from simulator output modulator 26 will be faithfully reproduced on the radar scope 4.

Electronic countermeasures circuit 1 (FIG. 1) comprises the elements shown in FIG. 2 as an ECM antenna pattern generator 30, an ECM video circuit 32, an FM video circuit 33, and a pin modulator 34. The block marked TX indicates that the output of the ECM circuit 1 is synchronized with the simulator circuits which allot the available time alternately to receiving and transmitting through antennas 10 and 12.

If the ECM signal is amplitude modulated with a varying DC signal that looks like a victim antenna pattern outline and if the modulation signal can be synchronized to the target azimuth, a victim radar will see all the hills and valleys of an antenna pattern which is independent of the radar and controlled by the ECM source operator. The pattern generation and synchronizing are accomplished by the ECM pattern generator 30 and the ECM video circuit 32. Two problems must be solved by the ECM pattern generator; first, an ECM pattern conforming to the design of the radar antenna must be generated, and two, the pattern must appear to center on the simulated target position and not the simulator position. To accomplish these tasks, the ECM pattern generator requires three information inputs: (1) the azimuth of the simulated target, (2) the rotation rate of the victim antenna, and (3) the reception pattern of the victim antenna. As an output, an analog voltage proportional to ECM strength is produced for use of the ECM video circuit 32.

Figure 3:
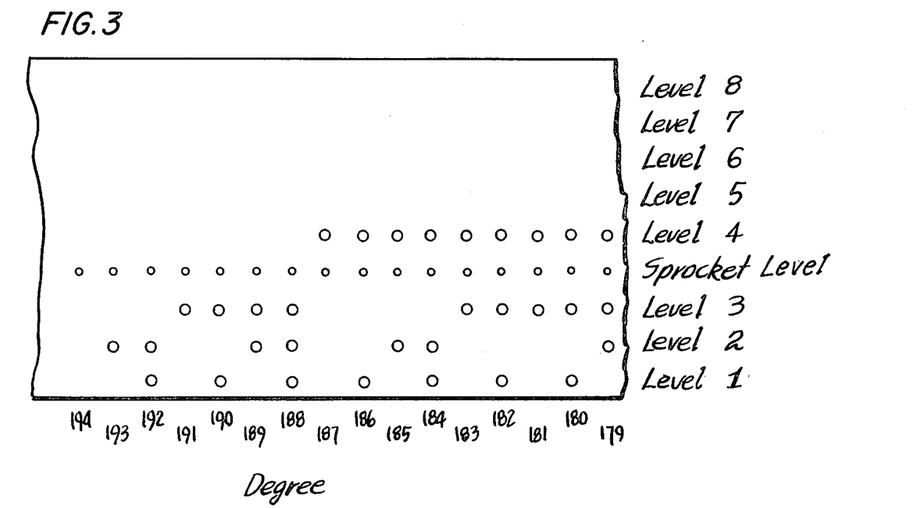
FIG. 3 shows a radar receiving pattern tape.

The first two input requirements for the ECM pattern generator are provided by the target azimuth generator 22 of simulator 8 and are its target azimuth output and its pulse per degree output. As explained in copending application Ser. No. 753,221, when the main lobe 7 of the radar antenna pattern sweeps across simulator antennas 10 and 12, azimuth null circuit 18 of simulator 8 forwards a synchronizing signal to target azimuth generator 22. Target azimuth generator 22 develops output signals including a target azimuth signal and a pulse per degree signal which are fed to ECM antenna pattern generator 30. The timing of the target azimuth output signal determines the azimuth of the fictitious target image seen on display 4 of victim radar 2. The pulse per degree output is synchronized with the rotation of radar antenna 6 so that one pulse is generated for each degree of antenna rotation. The remaining input required, the reception pattern of the antenna, is provided by a tape on which are recorded the characteristics of the antenna being victimized. One example of a tape is shown in FIG. 3. This is a paper tape joined end to end (making a loop) and has 360 characters (rows across the width of tape), one for each degree of antenna rotation. Up to eight holes (exclusive of the sprocket hole) can be punched to construct a single character. Four of these hole positions are used to define the antenna characteristic, three are used to locate particular positions on the tape, and one is not used. The hole positions are defined as levels. Levels 1, 2, 3, and 4 are used for the antenna characteristics and make up a 4 bit binary number with level 1 least significant and level 4 most significant. The presence of a hole in a particular level makes that position a logical "1" and the absence of a hole makes it a logical "0".

Figure 4:
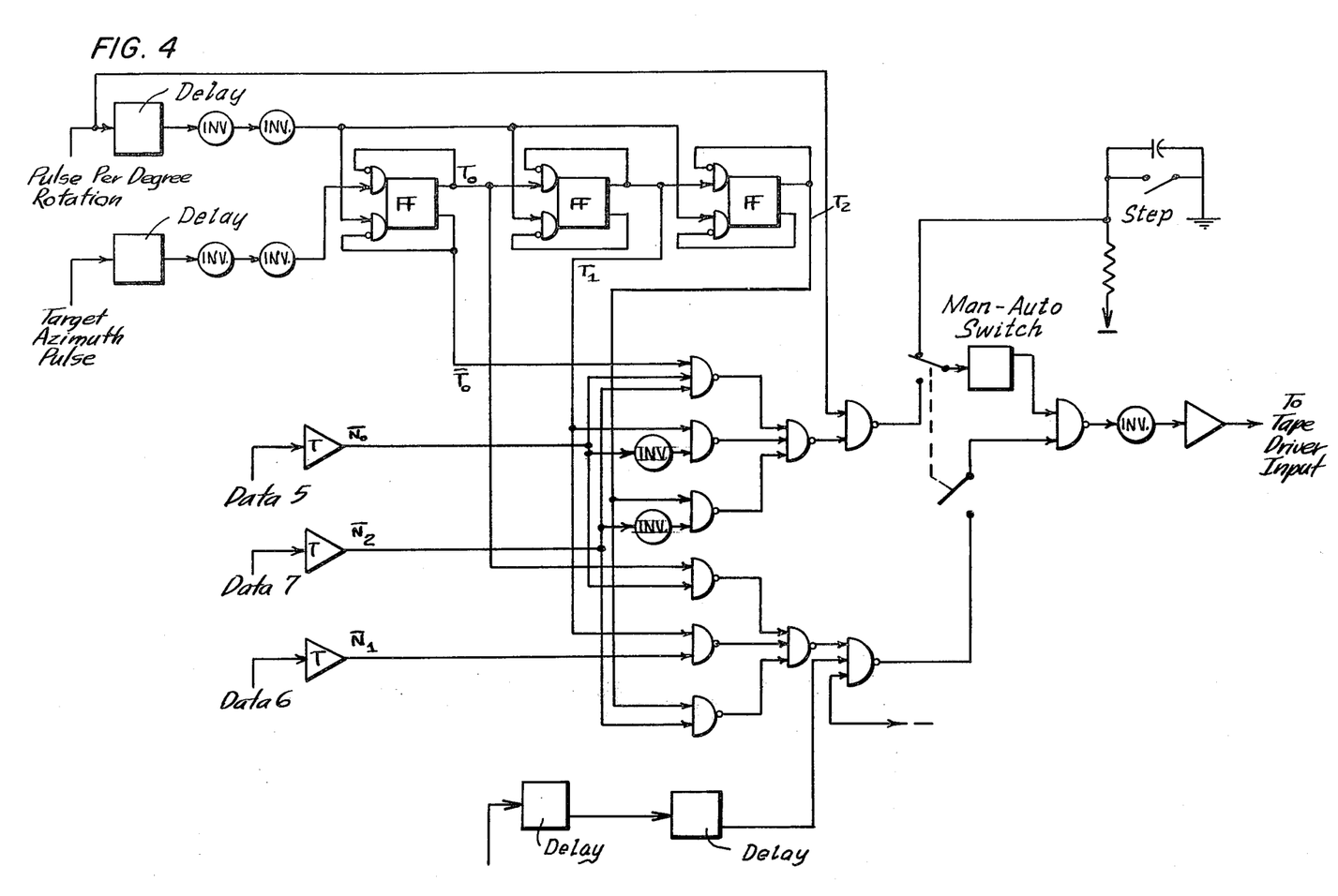
FIGS. 4 and 4a show a circuit schematic of the ECM antenna pattern generator 30 of FIG. 2.
Figure 4A:
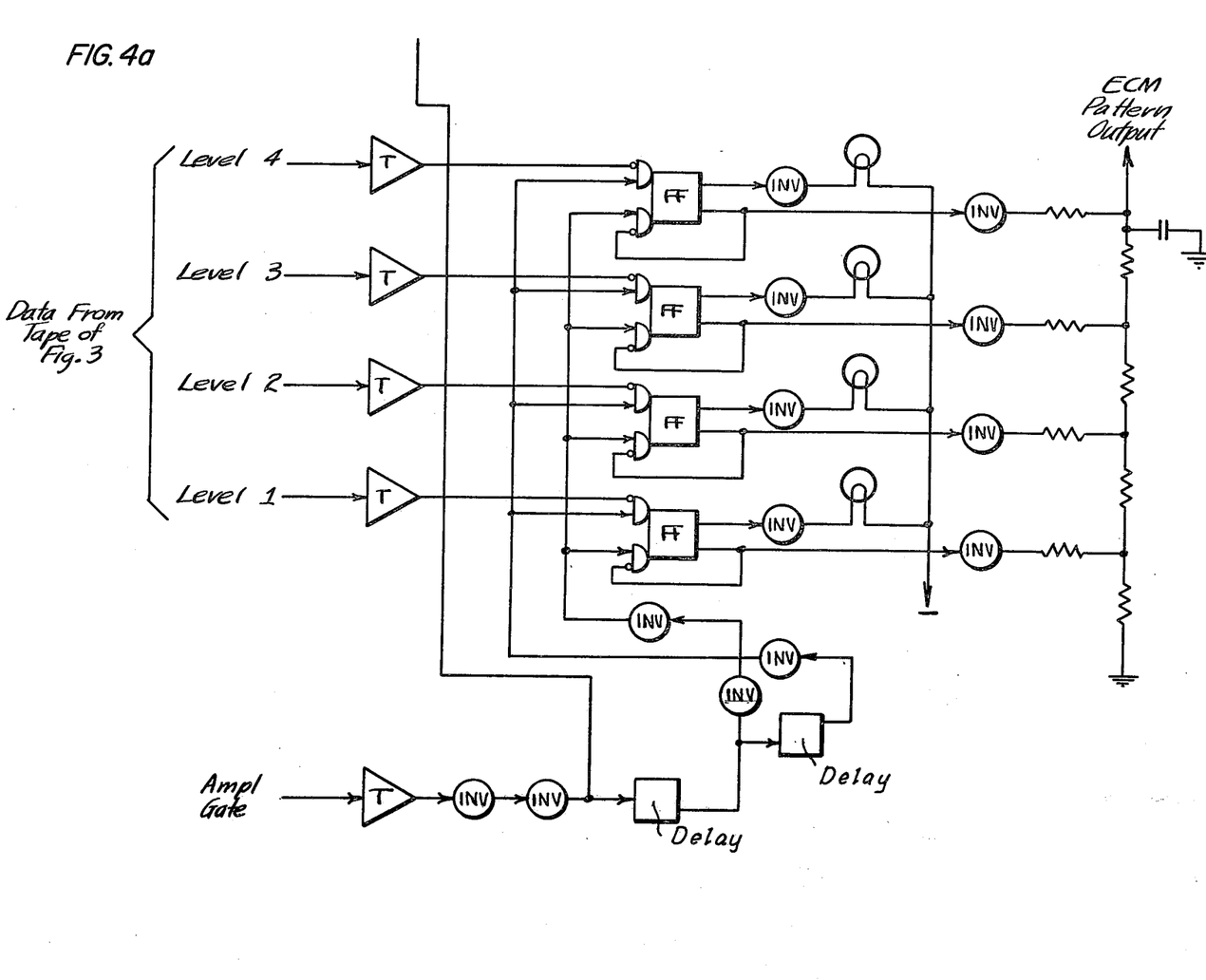
Figure 8:
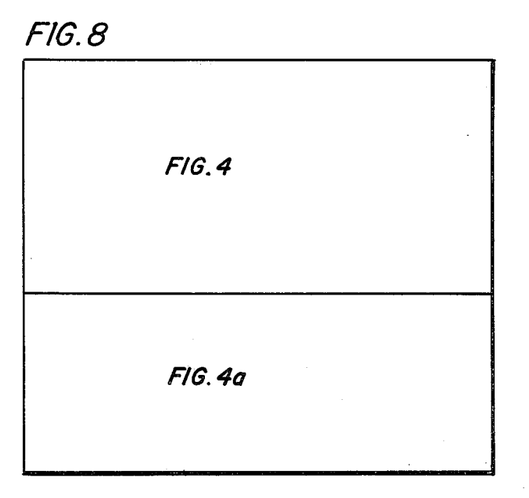
FIG. 8 shows how FIGS. 4 and 4a should be combined.

FIGS. 4 and 4a, when aligned as shown in FIG. 8, show a schematic of one circuit suitable for the ECM pattern generator 30. In FIG. 4a, data from levels 1-4 of the tape of FIG. 3 are applied to the four flipflops shown by means of suitable tape reader connections T and through suitable gating means. The "1" output terminals of the flipflops are connected through suitable inverters INV to the indicator lights L to show the antenna pattern code. The "0" output terminals of the flipflops are connected through inverters to the resistor ladder network shown. The analog output of the resistor network is the antenna reception pattern of the victim radar antenna. The input line marked "Ampl. Gate" is an input from a tape reading head aligned with the sprocket level of holes in the tape of FIG. 3. The Ampl. Gate input, delayed by a first delay circuit D, resets the data flipflops. The same delayed signal, after passing through a second delay, gates the information from tape levels 1-4 to the data flipflops through the gating connections shown.

The undelayed Ampl. Gate signal is fed through the lead shown connecting the circuits of FIGS. 4 and 4a and through two series connected delays of FIG. 4 and used in the tape speed synchronizing circuitry of FIG. 4. It is necessary to synchronize the speed of the antenna reception pattern tape of FIG. 3 with the rotation of the victim radar antenna so that the code representing the main lobe of the antenna pattern is sampled when the main lobe of the victim antenna pattern is pointed at the simulated target and apparent source of ECM signals. This is accomplished by comparing the signal representing the main lobe position from the tape reader of FIG. 3 with the target position as established by the target azimuth pulse from simulator 8. In FIG. 4, a target azimuth pulse is used to set the first flipflop of the chain of three flipflops shown. This target azimuth pulse is delayed in the delay shown to make sure that it occurs after the corresponding pulse from the pulse per degree output signal from simulator 8. When the first on target flipflop is set, the next pulse per degree signal resets the first flipflop, thus setting the second or target azimuth plus one degree flipflop. The next pulse per degree signal resets the target azimuth plus one degree flipflop and sets the target azimuth plus two degrees flipflop. The next pulse per degree resets the target azimuth plus two degrees flipflop leaving all the flipflops reset until the next target azimuth pulse is received.

The outputs from the three target flipflops of FIG. 4 are compared in the vertical array of six gates shown with the data from levels 5, 6, and 7 from the tape of FIG. 3. The data from level 5 represents the position of the code representing the main lobe on the antenna reception pattern, the data of level 6 represents the main lobe position plus one degree. The data from level 7 represents the main lobe position plus two degrees. Thus, the state of the three flipflops of FIG. 4 and the data from 5, 6, and 7 represent respectively the main lobe position as determined from the simulator 8 and the main lobe position as recorded on the tape of FIG. 3. The outputs of the vertical array of six gates are used to control the tape speed to maintain synchronization with the antenna rotation. Three gates enable the tape to advance at its normal speed, that is one increment per pulse per degree signal, the other three gates when activated cause the tape to advance at an accelerated rate. When neither of the two sets of three gates are activated, the tape does not advance but waits for synchronization.

The enabled condition for the three gates for normal advance is generated by the following conditions:

$$T_0 \bar{N}_0 \bar{N}_2 \text{ or } T_0 N_0 \text{ or } T_2 N_2$$

where $T_0$, $T_1$, and $T_2$ indicate the true conditions of the three target flipflops and $N_0$, $N_1$, and $N_2$ are for the fifth, sixth, and seventh level holes on the tape respectively. (A bar over a signal represents the absence of the signal.) Obviously, the last two sets of conditions are normal since they demonstrate perfect synchronization of the tape. (The delay circuit in the pulse per degree line compensates for the tape motion time.) The $T_0 \bar{N}_0$ part of the first term is a condition normal to 359 positions of the tape. The $\bar{N}_2$ signal is included because the fast run mode normally stops at $N_2$ if it cannot speed up the tape enough to achieve synchronism.

The enabled condition for the three gates for fast advance is generated by the following conditions:

$$T_0 \bar{N}_0 \text{ or } T_1 N_1 \text{ or } T_2 N_2$$

The three conditions obviously show a lack of synchronism which should be corrected. The fast mode can only be activated while either $T_0$, $T_1$, or $T_2$ are set, so the tape cannot be moved too far during the fast mode and is prevented by the $\bar{N}_2$ term from moving too far in the normal mode.

The normal mode enables advance of the tape on the receipt of the pulse per degree signal. The fast mode uses the sprocket hole signal (Ampl. Gate) to advance the tape after a 3 M seconds time delay. In either case a 1 M second signal is generated by a delay circuit for driving the tape motor. The tape drive per se is not part of this invention.

The delay circuits used may have an amplifying and/or pulse shaping function for driving following elements. For example, a one-shot multivibrator may amplify and shape a pulse and delay the actuation of following elements which respond to the trailing edge of the output pulse from the one-shot. The double-pole double-throw "Man-Auto-Switch" on the right of FIG. 4 when in the manual position shown, enables manual positioning of the tape for calibrating, synchronizing, or other purposes. The output of a pulsing circuit represented by the switch labeled "step" at the upper right of FIG. 4 is connected through the circuitry shown to the tape driver input as indicated. When the Man-Auto Switch is in its lower position the previously described logic circuitry of FIG. 4 causes the "pulse per degree rotation" signals or the "ampl gate" signals, or neither of these, to be coupled to the tape driver input as previously described.

The ECM pattern generator therefore maintains an analog signal representing the antenna receiving strength (over a 40 db range) as seen from the location of the simulated target. This analog output signal is applied to ECM video circuit 32.

Figure 5:
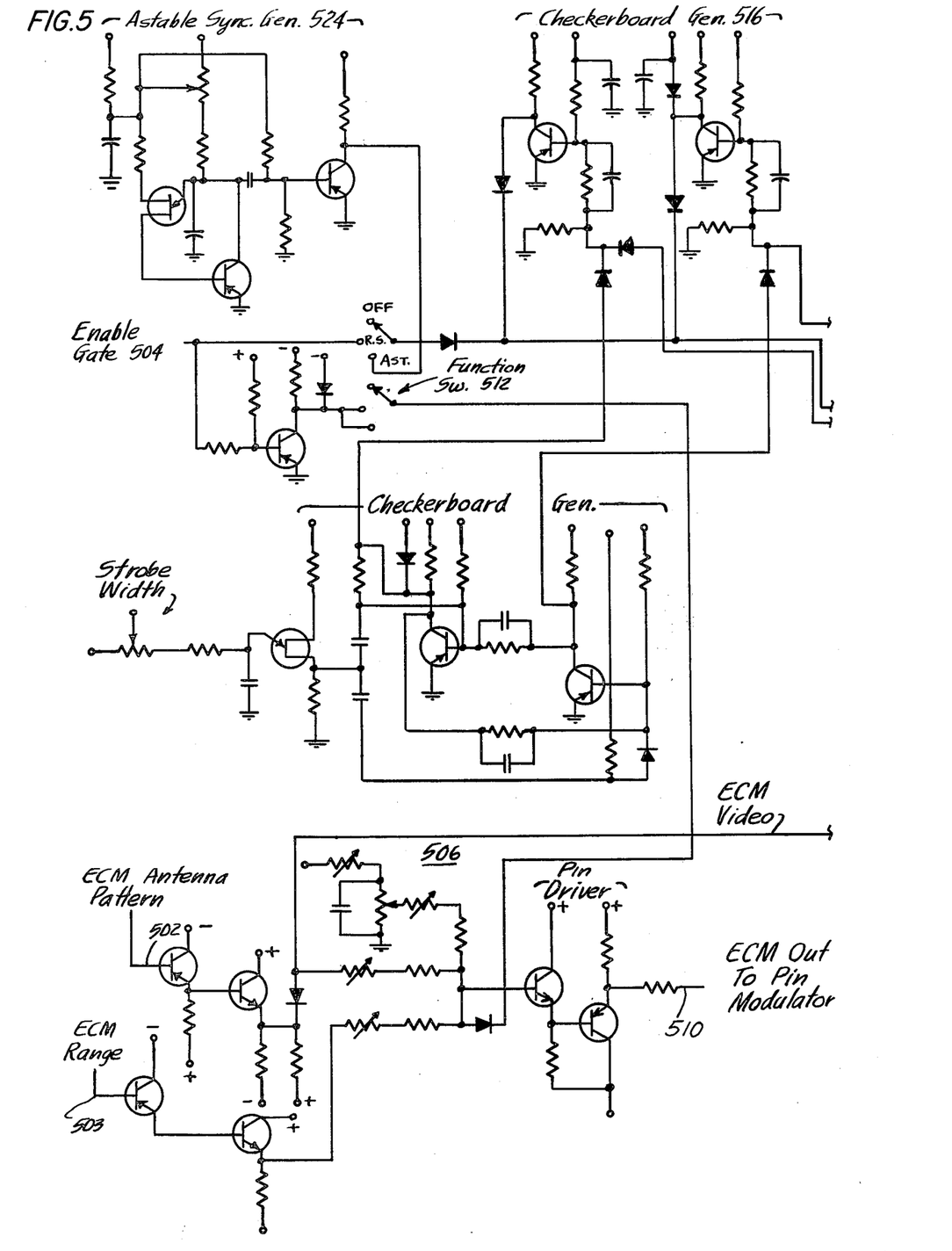
FIGS. 5 and 5a show a circuit schematic of ECM video circuit 32 of FIG. 2.
Figure 5A:
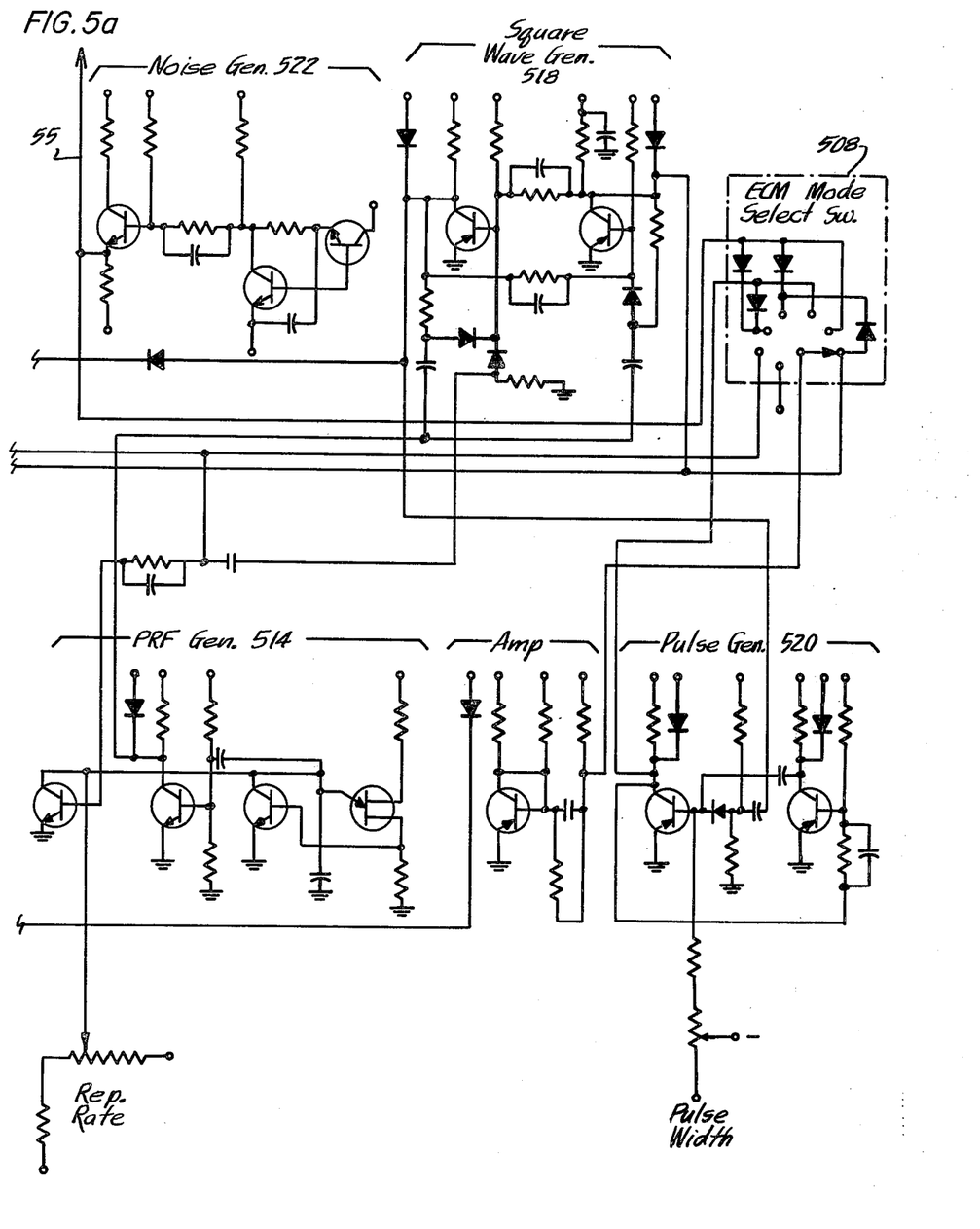
Figure 9:
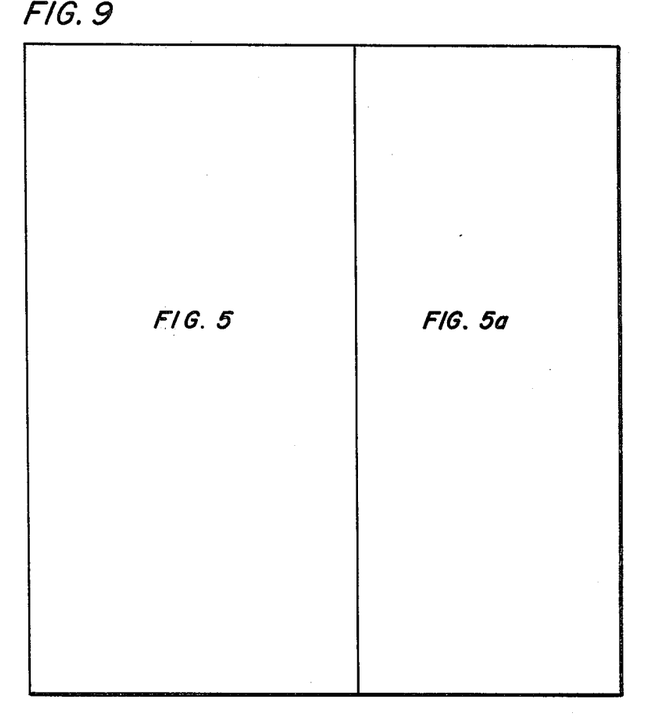
FIG. 9 shows how FIGS. 5 and 5a should be combined.

FIGS. 5 and 5a, positioned together in the manner shown in FIG. 9, comprise a circuit schematic of the ECM video circuit 32 of FIG. 2. The ECM video circuit receives the above mentioned antenna pattern analog signal on a lead 502, an ECM range signal on lead 503, as enable gate signal on lead 504 which is used to stop all transmissions at the end of each sweep time, a power level signal from network 506, and an ECM video signal from an operator controlled ECM mode select switch 508 which determines the type of AM jamming selected. The ECM range signal may be derived from simulator 8. These signals are combined and furnished over a lead 510 to the ECM pin modulator 34 of FIG. 2.

When a function switch 512 is in the "off" position, all ECM signals are turned off. When switch 512 is in the "RS" (radar sync) position, a PRF generator 514 and a checkerboard generator 516 are activated in synchronism with the radar. The PRF generator 514 triggers a square wave generator 518 which sends a square wave signal to the ECM mode select switch 508 and to a pulse generator 520. The square wave output signal is also used with a separate low-frequency multivibrator in the checkerboard generator 516 to make alternating phases of square wave jamming. A separate free running CW noise generator 522 provides another input to ECM mode select switch 508. Diode logic is used in switch 508 to select a desired signal or combination of signals to generate a particular ECM output. When function switch 512 is in a third position, the "astable" position, a separate internal sync generator 524 is connected to the enable gate input line 504. This allows the ECM patterns to get out of sync with the radar and to run across the radar PPI at a rate determined by the simulator operator.

Figure 6:
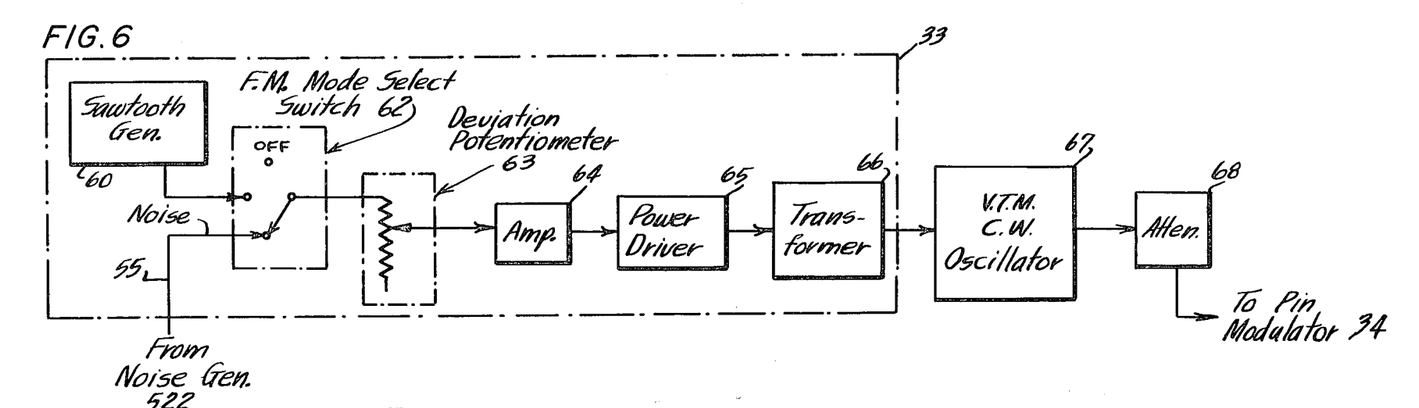
FIG. 6 shows a functional block diagram of the elements comprising FM video circuit 33.

The FM video circuit 33 of FIG. 2 is shown in block form in FIG. 6. The FM video circuit is used to generate two kinds of FM signals, sweep and noise, which are used in combination with any of the AM signals from the ECM video circuit 32. As shown in FIG. 6, a sawtooth generator 60 and a lead 55 from noise generator 522 of the ECM video circuit (FIG. 5a) are connected to respective contacts of an FM mode select switch 62. The sweep voltage from sawtooth generator 60 or the noise voltage from noise generator 522 is fed through a deviation potentiometer 63, an amplifier 64, a power driver 65, and a transformer 66 to a voltage tuned magnetron oscillator 67. The output of 67 is furnished through an attenuator 68 to pin modulator 34 of FIG. 2. The deviation potentiometer 63 can be adjusted by the operator to determine the amount of change in frequency in the system output up to a total swing of about 150 mc. The output frequency is swept back and forth across a selected band by the signal from sawtooth generator 60 or jittered across the band in a random manner by the noise from 522.

Figure 7:
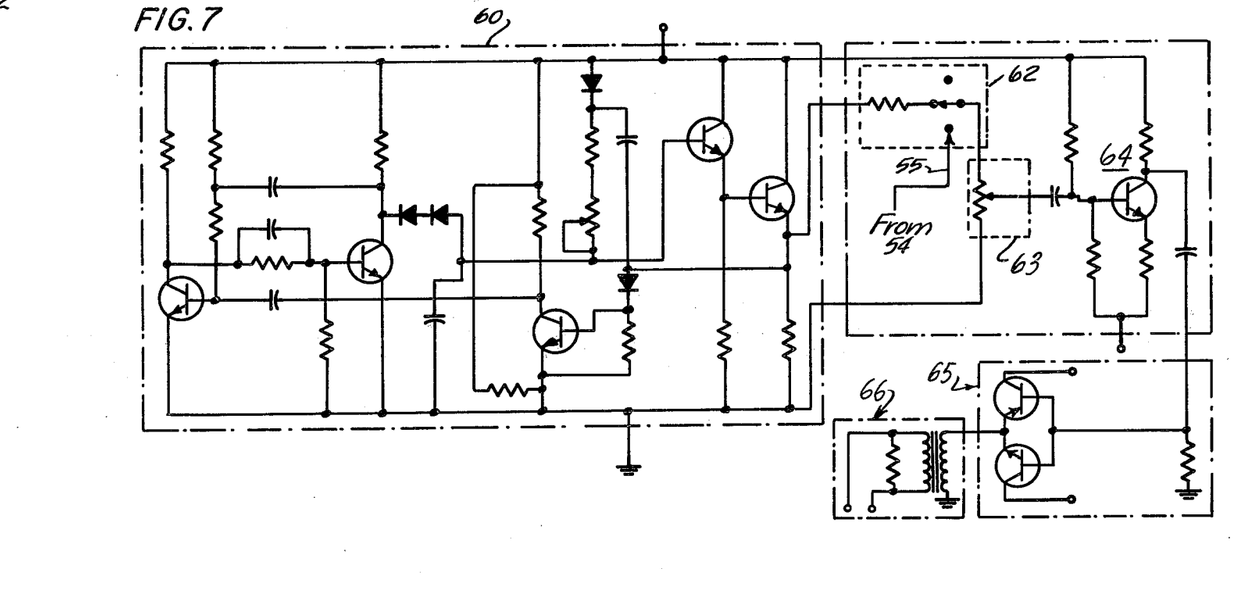
FIG. 7 is a circuit schematic of the FM video circuit 33.

FIG. 7 shows a circuit schematic of FM video circuit 33 of FIG. 2. The circuit is shown as one example of suitable circuitry for implementing the functional blocks in FIG. 6.

What is claimed is:
1. In a radar simulator, the improvement comprising: an electronic countermeasures signal generating means, said generating means being adapted to cooperate with a radar target simulator, means for transmitting a signal from said generating means at a selected time, means for selecting said time with respect to the rotation of the antenna pattern of a victim radar, whereby said signal is made to appear to said victim radar to originate at a location other than the location of said generating means, ECM antenna pattern generator means for generating a varying signal proportional to the variations in the antenna reception pattern of said victim radar, and means for combining an ECM signal with said varying signal.

2. The apparatus of claim 1, and including means for synchronizing said varying signal with the rotation of the antenna of said victim radar.

3. The apparatus of claim 2, and including ECM video circuit means for combining selected amplitude modulated signals with said varying signal.

4. The apparatus of claim 3, and including FM video circuit means for frequency modulating said combined amplitude modulated and varying signals.

5. The apparatus of claim 4, and including ECM mode select switch means whereby various combinations of AM signals may be selected to comprise said electronic countermeasures signal.

6. The apparatus of claim 5, and including means for selectively combining said combined amplitude modulated and varying signals with either a sawtooth voltage or a noise voltage.

7. The apparatus of claim 6, and including means for receiving radar target azimuth and range information signals from said radar target simulator, means for synchronizing the transmission of said electronic countermeasures signals with said azimuth and range information signals whereby said electronic countermeasures signals may be made to appear to said victim radar to emanate from the same azimuth and range as a radar target signal from said simulator.

8. The apparatus of claim 2, wherein said means for synchronizing said varying signal with the rotation of the antenna of said victim radar include a moving recording means on which said varying signal is recorded and means for changing the speed of movement of said recording means.

* * * * *